(12) United States Patent
Noguchi

(10) Patent No.: US 6,714,231 B2
(45) Date of Patent: Mar. 30, 2004

(54) IMAGE FORMING APPARATUS AND LASER DRIVE CONTROL METHOD THEREIN

(75) Inventor: Junichi Noguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 422 days.

(21) Appl. No.: 09/867,471

(22) Filed: May 31, 2001

(65) Prior Publication Data

US 2001/0048461 A1 Dec. 6, 2001

(30) Foreign Application Priority Data

May 31, 2000 (JP) ........................................ 2000-163370

(51) Int. Cl.[7] .............................. B41J 2/435; G01J 1/32; H01J 3/14
(52) U.S. Cl. ..................... 347/246; 347/247; 347/248; 347/255; 250/205; 250/234; 250/201.9
(58) Field of Search ....................... 400/118.2; 347/246, 347/247, 248, 237, 133, 255; 250/205, 234, 201.9, 235

(56) References Cited

U.S. PATENT DOCUMENTS

| 4,707,709 A | * 11/1987 | Tsilibes ....................... 347/255 |
| 4,707,715 A | * 11/1987 | Miura ........................ 347/129 |
| 4,761,659 A | * 8/1988 | Negishi ....................... 347/247 |
| 4,768,043 A | * 8/1988 | Saito et al. .................. 347/252 |
| 4,794,413 A | * 12/1988 | Yamazaki et al. ........... 347/247 |
| 4,796,997 A | * 1/1989 | Svetkoff et al. ............. 356/608 |
| 5,225,850 A | * 7/1993 | Egawa et al. ................ 347/246 |
| 5,473,153 A | * 12/1995 | Araki et al. ................. 250/205 |
| 5,530,242 A | * 6/1996 | Genovese .................... 250/234 |
| 5,920,336 A | * 7/1999 | Lawton et al. .............. 347/255 |
| 5,973,787 A | * 10/1999 | Aspnes et al. .............. 356/369 |
| 6,052,141 A | 4/2000 | Takeuchi .................... 347/246 |
| 6,198,497 B1 | * 3/2001 | Luque ........................ 347/247 |
| 6,445,401 B2 | * 9/2002 | Iwazaki ...................... 347/133 |
| 6,476,844 B1 | * 11/2002 | Ream ......................... 347/237 |
| 6,538,247 B2 | * 3/2003 | Iizuka ........................ 250/234 |

* cited by examiner

Primary Examiner—Stephen R. Funk
Assistant Examiner—Wasseem H. Hamdan
(74) Attorney, Agent, or Firm—Fitzpatrick, Cella, Harper & Scinto

(57) ABSTRACT

An image forming apparatus for forming an image by modulating laser light in correspondence with an image signal. A pulsewidth modulation signal is generated in correspondence with input image data. A laser drive control circuit has a photosensor PD which detects laser light emitted from a laser diode LD and generates a detection current, a resistor which generates a detection voltage corresponding to the detection current outputted from the photosensor PD, a buffer in which the generated detection voltage is inputted, an amplifier which amplifies an output from the buffer, and a constant current source and a switch to add a predetermined current to the detection current for compensation for reduction of output voltage due to offset voltages of the buffer and the amplifier. Control data for controlling maximum and minimum pulsewidths in the pulsewidth modulation signal are obtained based on the detection voltage, and generation of the pulsewidth modulation signal is controlled.

9 Claims, 11 Drawing Sheets

IMAGE FORMING APPARATUS AND LASER DRIVE CONTROL METHOD THEREIN

FIELD OF THE INVENTION

The present invention relates to an image forming apparatus and a laser drive control method in the apparatus for image formation by scanning laser light, modulated in accordance with an image signal, on a photosensitive body.

BACKGROUND OF THE INVENTION

As a conventionally known image forming apparatus to print-output an image data, a laser-beam printer drives a laser to emit light by a drive signal modulated based on image information, scans the laser light on a photosensitive body and thereby forms an electrostatic latent image on the exposed photosensitive body, and then records a desired image through a duplication process including development, transfer and fixing. When the laser is driven to emit laser light, auto power control (APC) is performed to reduce changes in light emission output due to changes based on temperature characteristic and secular change of the laser.

This control is made by detecting a part of the laser light emitted from the laser by using a photosensor, converting a current value outputted from the photosensor in correspondence with the detected light amount into a voltage, and outputting the voltage as a voltage PDOUT via a buffer and an amplifier. The light emitting characteristic of the laser is obtained from the voltage PDOUT, which is obtained to detect a part of the laser light emitted from the laser drive by a PWM pulse.

FIG. 9 is a line graph showing the relation between the laser light amount with respect to a PWM pulsewidth corresponding to the drive signal to drive the laser and the voltage PDOUT to monitor the laser light amount.

At a point A in FIG. 9, the laser starts light emission in correspondence with a PWM pulse having a specific width. When the light emission is started, the amount of emitted light linearly increases with respect to the pulsewidth. Then at a point B, the pulsewidth has a value greater than a predetermined value, and the light amount increases with a greater gradient with respect to the pulsewidth. Thereafter, the light amount is saturated to a value Psat. This means the light amount becomes abruptly beyond Pmax, even if the laser drive current is turned off, as injection carrier density becomes off with a time constant, it is influenced by the pulse for the previous pixel. Generally, the PWM pulsewidth is adjusted such that the pulsewidth is a minimum pulsewidth when the image data has a minimum value at the point A, and the pulsewidth is a maximum pulsewidth when the image data has a maximum value at the point B.

The points A and B in FIG. 9 differ according to minute difference in characteristics of respective lasers, laser drive current circuits to drive these lasers, environmental temperatures around the semiconductor lasers, and the like. Accordingly, the pulsewidth must be controlled at every occurrence of change in the environment of laser unit as a combination of laser and laser drive current circuit. Generally, the voltage PDOUT to monitor the laser light amount is measured at predetermined timings and the maximum and minimum pulsewidths are controlled.

The above control method is based on the assumption that the amount of emitted laser light and the voltage PDOUT are proportional. However, as the voltage PDOUT is obtained by outputting a voltage, based on the output of a photodiode which has detected the laser light amount, through circuits such as a buffer and OP amplifier, the influence by input offset voltage components existing in the buffer and the OP amplifier cannot be ignored.

Originally, the characteristic of light amount with respect to PWM pulsewidth and the PDOUT characteristic with respect to PWM pulsewidth should be in a similitude relation, however, as shown in FIG. 9, at the point A in the light amount characteristic for minimum pulsewidth control, the PDOUT characteristic with respect to the PWM pulsewidth is shifted to a point A' due to the input offset voltage components. Similarly, at the point B for maximum pulsewidth control, the PDOUT characteristic with respect to the PWM pulsewidth is shifted to a point B'. Accordingly, when the pulsewidth control is performed to obtain the PWM minimum and maximum pulsewidths while monitoring the voltage PDOUT, the light amount characteristic of the laser light does not correspond with the pulsewidth.

SUMMARY OF THE INVENTION

The present invention has been made in consideration of the above conventional art, and has its object to provide an image forming apparatus and a laser drive control method in the apparatus for driving a laser in accordance with the amount of laser light emission without influence of the above-described offset components.

Further, another object of the present invention is to provide an image forming apparatus and a laser drive control method in the apparatus capable of accurately detecting the amount of light emitted from the laser and performing drive pulsewidth control in correspondence with the detected light amount.

In order to attain the above described objects, an image forming apparatus of the present invention comprising the structures as follows.

An image forming apparatus for forming an image by modulating laser light in accordance with an image signal, comprising: detection means for detecting laser light emitted from a laser diode and generating a detection current corresponding to the intensity of the laser light; detection voltage generation means for generating a detection voltage based on the detection current outputted from the detection means; and current supply means for adding a predetermined current to the detection current generated by the detection means and applying the detection current to the detection voltage generation means so as to compensate for the detection voltage generated by the detection voltage generation means.

In order to attain the above described objects, a laser drive control method of the present invention comprising the steps as follows.

A laser drive control method in an image forming apparatus for forming an image by modulating laser light in accordance with an image signal, comprising: a detection step of detecting laser light emitted from a laser diode and generating a detection current corresponding to the intensity of the laser light; a detection voltage generation step of generating a detection voltage based on the detection current outputted at the detection step; and a current supply step of adding a predetermined current to the detection current generated at the detection step so as to compensate for the detection voltage generated at the detection voltage generation step.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENT

A preferred embodiment of the present invention will now be described in detail in accordance with the accompanying drawings.

Figure 1:
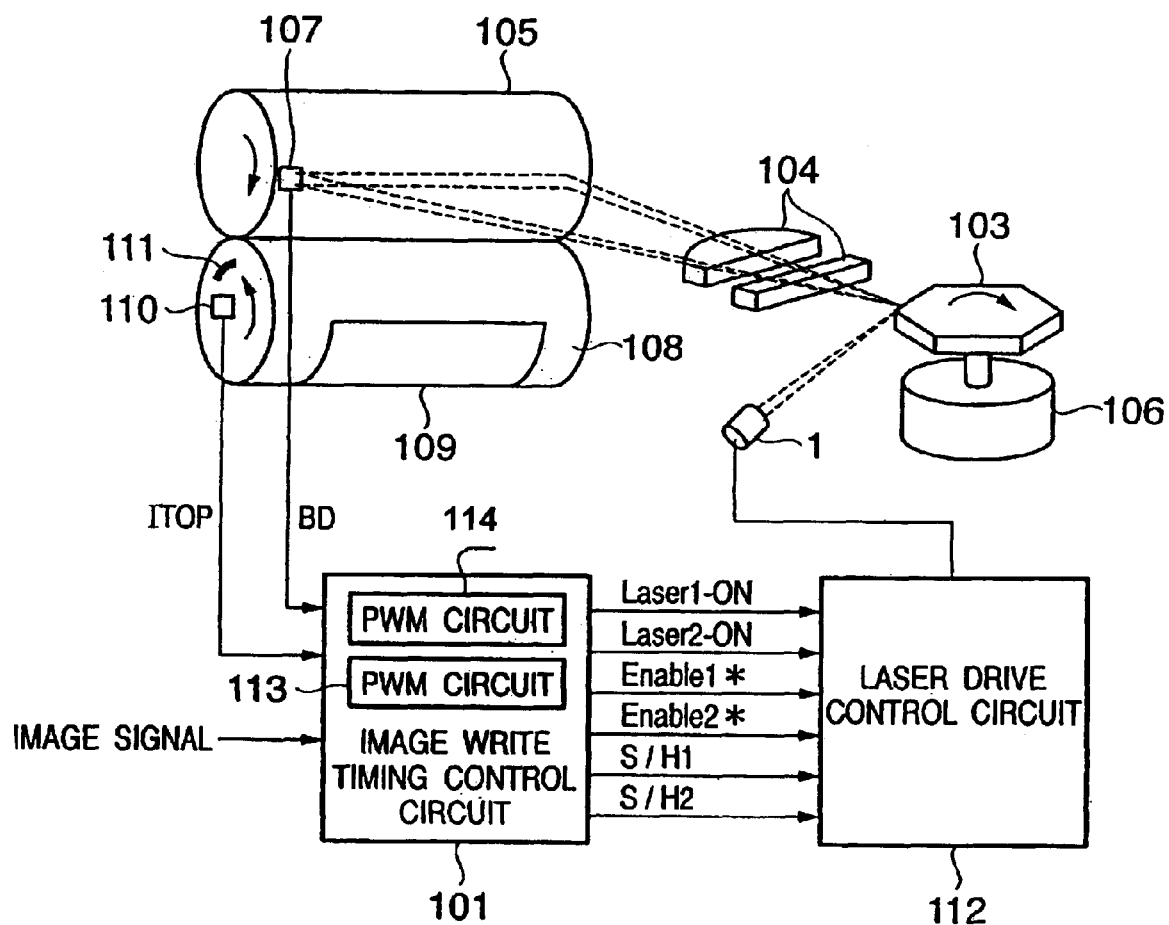
FIG. 1 is a block diagram showing a schematic construction of an image forming apparatus (laser-beam printer) according to an embodiment of the present invention.

FIG. 1 is a block diagram showing a schematic construction of an image forming apparatus (laser-beam printer) having a 2-beam laser driving circuit according to an embodiment of the present invention.

Figure 2:
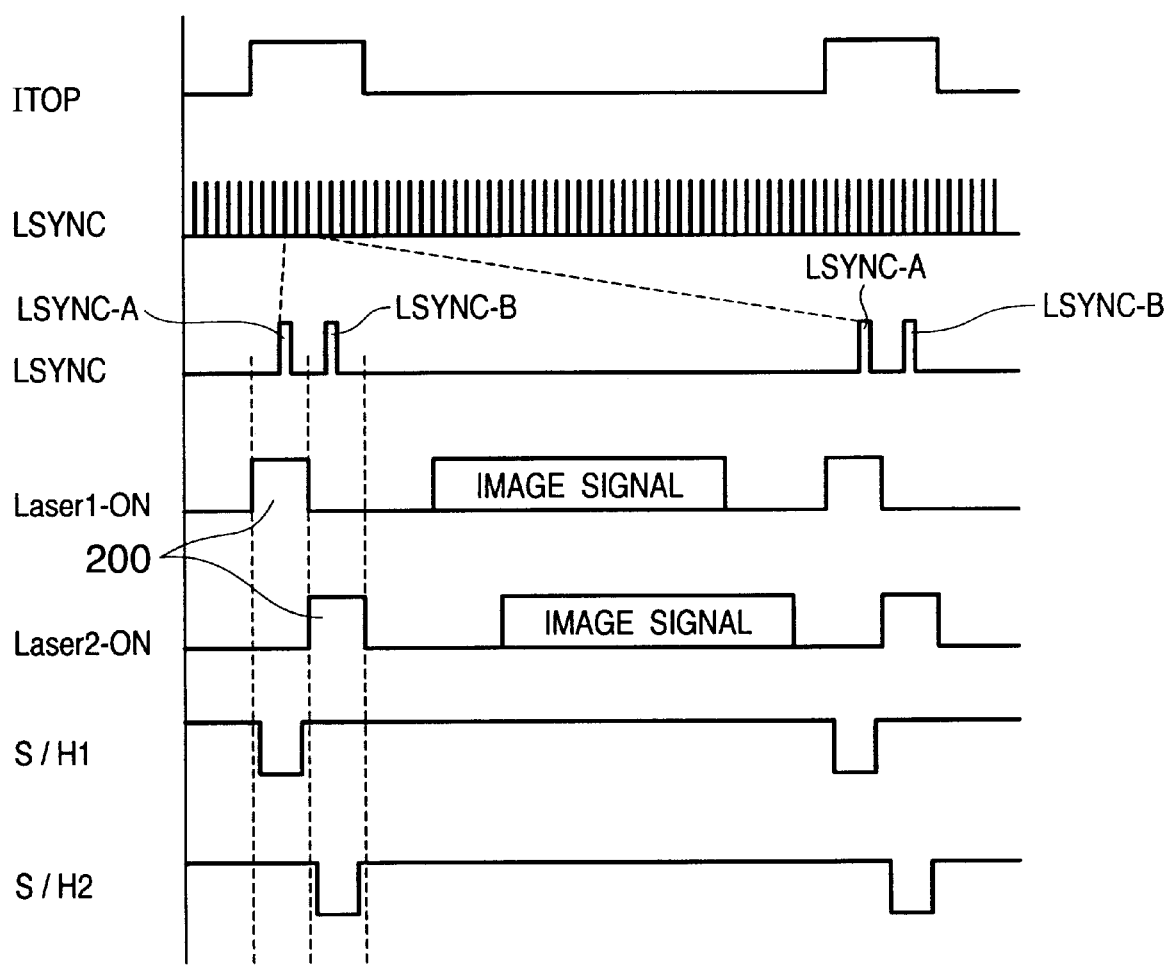
FIG. 2 is a timing chart showing timings of laser-on signals in the image forming apparatus according to the embodiment.

In FIG. 1, an image signal, sent from an external device (not shown) such as an image scanner or a computer, is supplied to an image write timing control circuit 101. The image write timing control circuit 101 generates laser-on signals (signals Laser1-ON and Laser2-ON) as shown in FIG. 2, in correspondence with image signals of magenta (M), cyan (C), yellow (Y) and black (BK).

In the image write timing control circuit 101, image data is allotted to respective laser diode drivings by each line. That is, the image data for an odd-numbered line is outputted by the signal Laser1-ON, while the image data for an even-numbered line is outputted by the signal Laser2-ON. Further, PWM circuits 113 and 114 respectively perform PWM (Pulse Width Modulation) corresponding to the image signals for odd-numbered and even-numbered lines. Outputs from the PWM circuits 113 and 114 become the signals Laser1-ON and Laser2-ON. A laser drive control circuit 112 modulate-drives a laser diode 1 in correspondence with the laser-on signals (Laser1-ON and Laser2-ON) from the image write timing control circuit 101. The laser diode 1 includes two laser diodes LD1-1 and LD1-2. That is, the signal Laser1-ON modulate-drives the laser diode LD1-1, while the signal Laser2-ON modulate-drives the laser diode LD1-2. Laser light from the two laser diodes are reflected by a polygon mirror 103 which rotates in an arrow direction by rotation drive of a polygon motor 106, fθ corrected by an f-θ lens 104, and scanned on an electrostatic drum 105. Thus an electrostatic latent image is formed on the electrostatic drum 105.

A BD (Beam Detect) sensor 107, provided around a 1-line laser-light scanning position, detects line scanning of laser light, and the image write timing control circuit 101 generates scan start reference signals (LSYNC signals) for respective lines in the same period and sample/hold signals (S/H1 and S/H2). In the present embodiment, as the image forming apparatus is a 2-beam laser-beam printer where the both laser beams are scanned on the same BD sensor 107, two synchronizing pulses (LSYNC-A and LSYNC-B) are generated within one period as the LSYNC signals.

When a predetermined period has elapsed since input of the initial pulse LSYNC-A, the image signal for the laser diode LD1-1 (Laser1-ON) is outputted, then, when a predetermined period has elapsed since input of the next pulse LSYNC-B, the image signal for the laser diode LD1-2 (Laser2-ON) is outputted.

These Laser1-ON and Laser2-ON signals are used for turn-ON driving to detect the LSYNC signals (200 in FIG. 2) as well as image formation. In this case, the level of the signal Laser1-ON becomes high, and upon detection of the pulse LSYNC-A, the level of the signal Laser1-ON becomes low (to turn the laser diode LD1-1 OFF), instead, the level of the signal Laser2-ON becomes high (to turn the laser diode LD1-2 ON). Then the pulse LSYNC-B is detected, the level of the signal Laser2-ON becomes low.

Further, magenta (M), cyan (C), yellow (Y) and black (BK) developers are provided around the electrostatic drum 105. The four developers come into contact with the electrostatic drum by turns while the electrostatic drum 105 makes 4 turns, and develop M, C, Y and BK (black) electrostatic latent images formed on the electrostatic drum 105 with corresponding toner. Then, a print sheet 109 supplied from a paper cassette (not shown) is placed around a transfer drum 108, and toner images developed by the developers are transferred onto the print sheet 109. The transfer drum 108 includes a sensor 110 to generate an ITOP signal indicating an end position of the print sheet 109 on the transfer drum 108. When the transfer drum 108 rotates and a flag 111 fixed in the transfer drum 108 passes through the sensor 110, the ITOP signal as shown in FIG. 2 is generated for the respective colors. An image write start position in a subscanning direction is determined based on the ITOP signal, and an image write start position in a main scanning direction is determined based on the LSYNC signal. In this manner, the four M, C, Y and BK color images are sequentially transferred onto the print sheet 109, then the print sheet 109 is discharged through a fixing unit (not shown).

Figure 3:
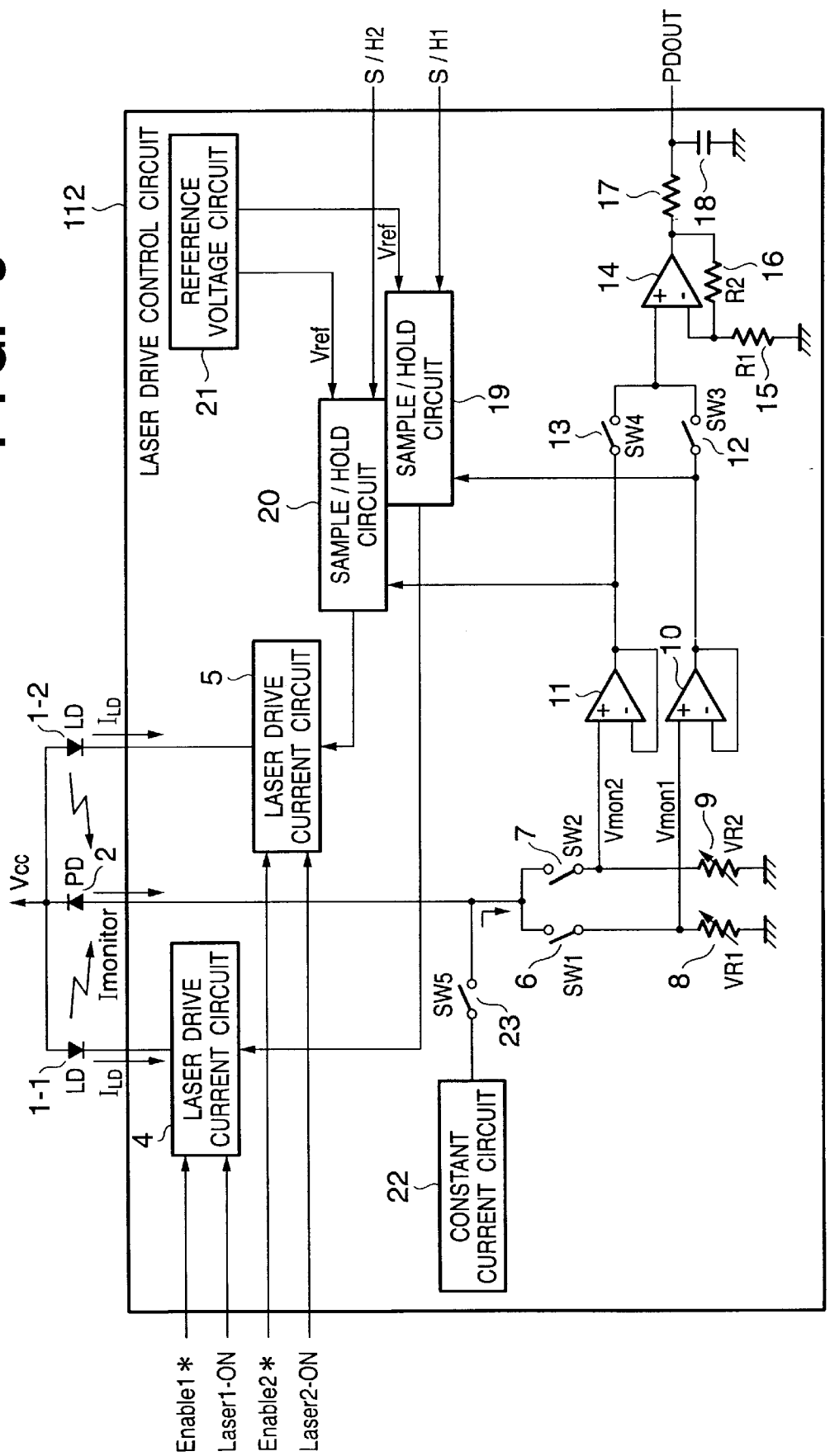
FIG. 3 is a block diagram showing the construction of a laser drive control circuit in the image forming apparatus according to the embodiment.

FIG. 3 is a block diagram mainly explaining the construction of the laser drive control circuit 112 according to the embodiment. In this embodiment, the laser drive control circuit 112 has a construction of 2-beam laser drive circuit which drives two laser diodes and performs APC on the respective laser diodes.

First, the operation principles of the laser diode (LD) LD1-1 will be described. A laser drive current circuit 4 turns on the laser diode LD1-1 with a constant current when the level of a signal Enable1* (* represents negative logic signal (low true)) to permit turning the laser on is "High level (H)"→"Low level (L)" and the level of the Laser1-ON signal is logical "H". The laser diode LD1-1 emits light in correspondence with the value of the supplied constant current. At this time, a photodiode PD2 inputs a part of the laser light emitted from the laser diode LD1-1 and generates a current (Imonitor) corresponding to the input light amount. Upon sampling, as a switch (SWS) 23 is opened while a switch (SW1) 6 is closed, the current (Imonitor) flows through a variable resistor (VR1) 8, thereby a voltage (Vmon1) is generated. The voltage (Vmon1) is inputted into a sample/hold circuit 19 through a buffer 10. Further, a reference voltage (Vref) from a reference voltage circuit 21 is inputted into the sample/hold circuit 19.

Figure 4:
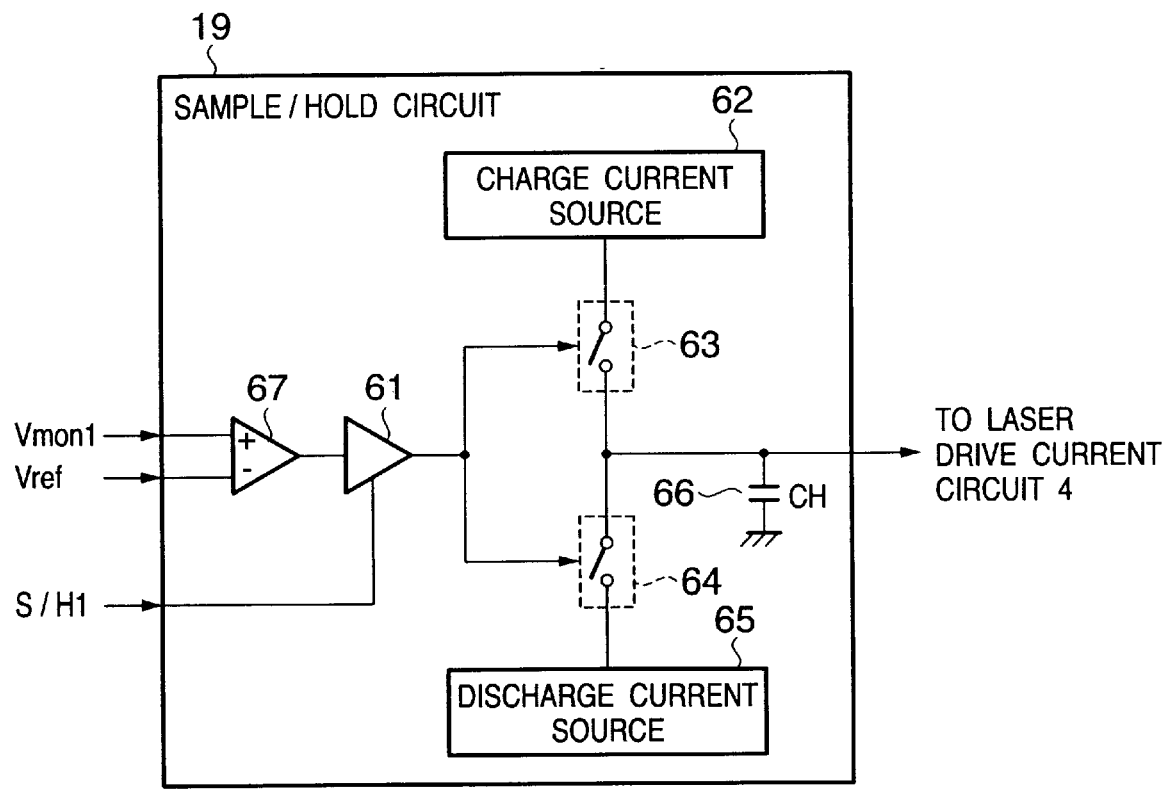
FIG. 4 is a block diagram showing the details of a sample/hold circuit according to the embodiment.

FIG. 4 is a block diagram showing an example of the construction of the sample/hold circuit 19 according to the embodiment.

The voltage from the buffer 10 (Vmon1) and the reference voltage Vref from the reference voltage circuit 21, inputted in the sample/hold circuit 19, are respectively inputted into non-inversion terminal (+) and an inversion terminal (−) of a comparator 67. The comparator 67 compares the voltages Vmon1 and Vref, and if Vmon1<Vref holds, outputs a low-level signal, while if Vmon1>Vref holds, outputs a high-level signal. If the output from the comparator 67 is at the low level when the signal S/H1 is at a high level (sample), a switch 63 is closed while a switch 64 is opened, and a charge current flows from a charge current source 62 to a capacitor (CH) 66. On the other hand, if the output from the comparator 67 is at the high level, the switch 63 is opened while the switch 64 is closed, and a discharge current flows from the capacitor (CH) 66 to a discharge current source 65.

Further, when the signal S/H1 is at a low level (hold), as the impedance of output from a buffer 61 becomes high and the switches 63 and 64 are opened, the charge amount (voltage value) in the capacitor (CH) 66 is held.

The laser drive current circuit 4 determines the amount of drive current to the laser diode LD1-1 in correspondence with the voltage value charged in the capacitor (CH) 66. In this manner, the sample/hold circuit 19 controls the laser drive current circuit 4 such that Vmon1=Vref holds. Further, the light emission intensity of the laser diode LD1-1 can be changed by varying the resistance value of the variable resistor (VR1) 8.

The operation principles of the laser diode LD1-2 are the same as that of the laser diode LD1-1. However, as the APC sampling operation cannot be performed at the same timing of that in case of the laser diode LD1-1, the timing of the sampling operation must be shifted. The other operation principles and constructions of the laser drive circuit 5 and the sample/hold circuit 20 are the same as those in case of the laser diode LD1-1, the explanations of the principles and constructions will be omitted.

The laser drive control circuit 112 in FIG. 3 has a construction also capable of externally monitoring the light emission intensity of the laser diode. For example, when the light emission intensity of the laser diode LD1-1 is monitored, the switch (SW1) 6 and a switch (SW3) 12 are closed (a switch (SW2) 7 and a switch (SW4) 13 are opened), thereby the voltage PDOUT corresponding to the light emission intensity is outputted. That is, the voltage (Vmon1) is inputted via the buffer 10 into an OP amplifier 14, and amplified by the OP amplifier 14, a resistor (R1) 15 and a resistor (R2) 16 to (1+R2/R1) times, and the amplified voltage is outputted as the voltage PDOUT indicating the light emission characteristic of the laser diode LD1-1, through a low-pass filter constructed with a resistor 17 and a capacitor 18, to the outside.

Similarly, in case of the laser diode LD1-2, the voltage PDOUT corresponding to the light emission intensity of the laser diode LD1-2 is outputted by closing the switch (SW2) 7 and the switch (SW4) 13 while opening the switch (SW1) 6 and the switch (SW3) 12.

The image forming apparatus is based on a binary printing method of turning a laser diode LD on/off for each pixel based on image information or multivalue printing method of on/off control with predetermined on and off periods. In the latter method, generally, the laser diode LD is turned on/off by a signal modulated by pulsewidth modulation (PWM).

Figure 5A:
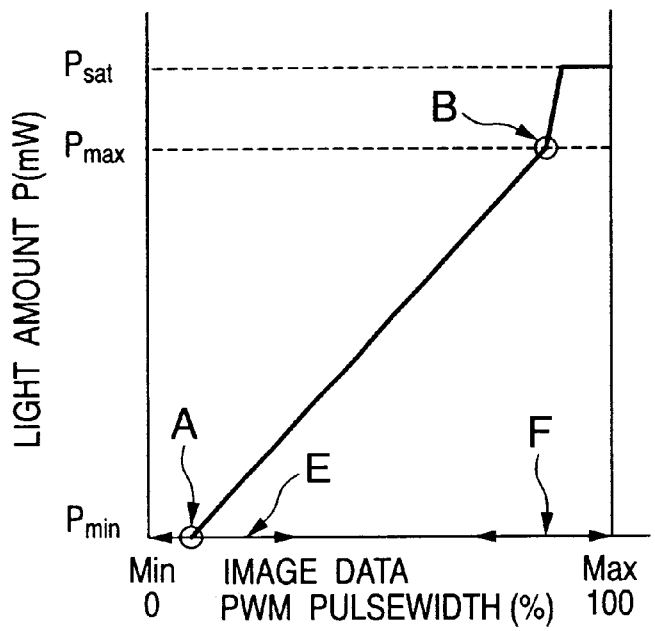
FIGS. 5A and 5B are line graphs showing the characteristics of the light amount and the voltage PDOUT with respect to a PWM pulsewidth for explaining minimum and maximum pulsewidth control in a laser drive PWM signal.

FIG. 5A shows a laser characteristic when a laser diode is turned on by this PWM, i.e., the light amount of the laser diode with respect to a PWM pulsewidth in 1 pixel (corresponding to image data value) to turn on the laser diode.

The laser diode has a characteristic that it does not emit light until the injection carrier density has a predetermined value even if a drive current instantaneously rises. As the injection carrier density rises with a time constant, the laser diode does not emit light until it receives a signal of PWM pulsewidth equal to or greater than the time constant. For this reason, as shown in FIG. 5A, the laser diode starts light emission from a predetermined PWM pulsewidth at a point A. When the laser diode has started light emission, the amount of emitted light linearly increases with respect to the pulsewidth. Then, when the pulsewidth exceeds a predetermined value, the light amount increases with a greater gradient at a point B in FIG. 5A. Thereafter, when the pulsewidth is further increased, the amount of light emission is saturated to a value Psat. This means that even when the laser drive current is turned off, as the injection carrier density becomes off with the time constant, the light emission is influenced by the previous drive pulse. Generally, at the point A in FIG. 5A, the pulsewidth is controlled to a minimum pulsewidth when the image data has a minimum value, and at the point B, the pulsewidth is controlled to a maximum pulsewidth when the image data has a maximum value.

Figure 6:
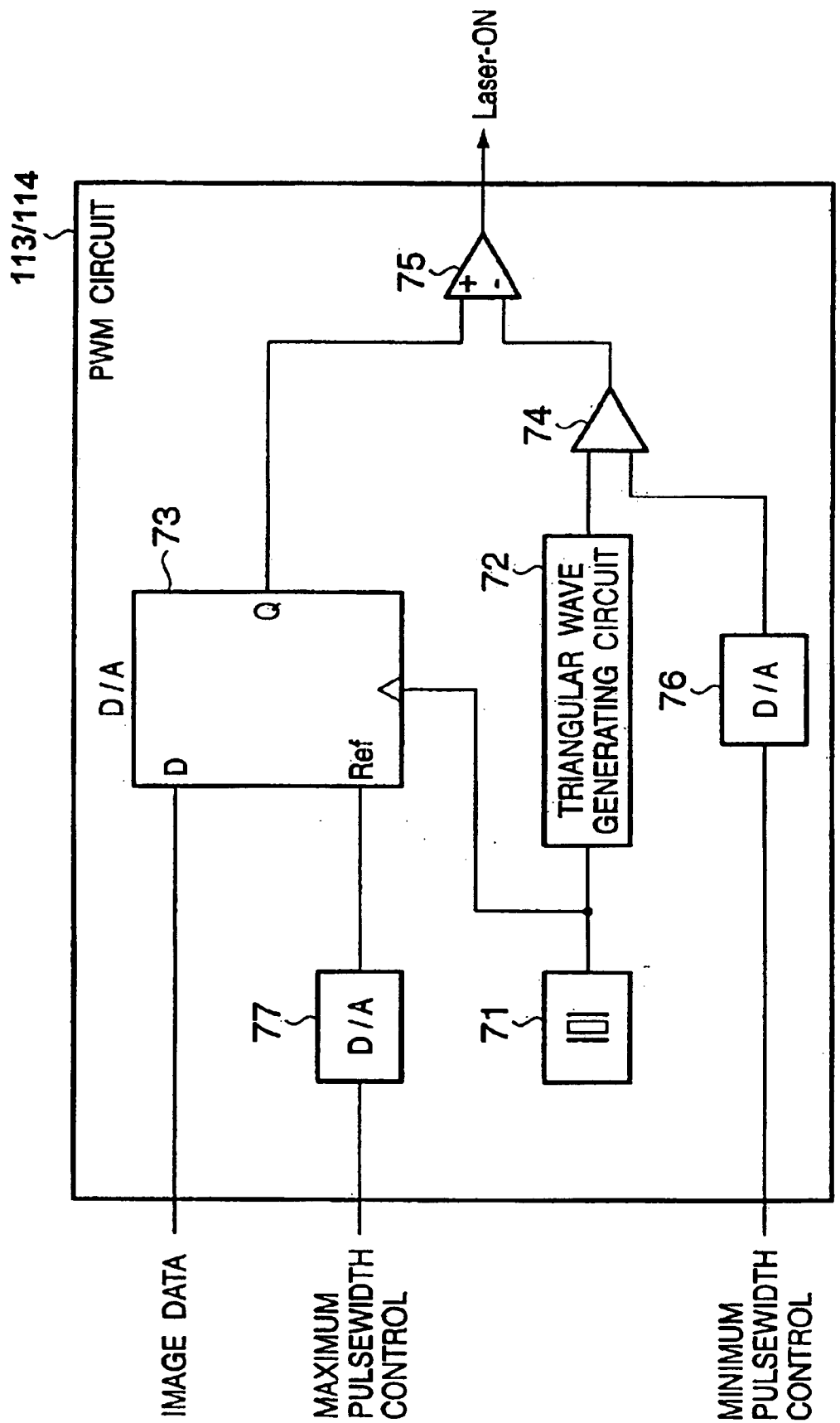
FIG. 6 is a block diagram showing a PWM circuit in the embodiment.

FIG. 6 is a block diagram showing an example of the construction of the PWM circuit 113 (114). Note that the 2-beam image forming apparatus has the PWM circuits 113 and 114 for each laser diode. As these laser diode have the same construction, the one PWM circuit 113 will be described here.

A clock outputted from a crystal oscillator 71 has a 1-pixel period, and a triangular wave generating circuit 72 generates a triangular wave based on the pixel clock. An OP amplifier 74 adds an offset amount corresponding to an analog value of output from a D/A converter 76 to the triangular wave from the triangular wave generating circuit 72. Further, a D/A converter 73 performs D/A conversion on image data at timing of the rise of the pixel clock. Then a comparator 75 compares the triangular wave to which the offset is added with an output from the D/A converter 73, and if the output from the D/A converter 73 (image signal) is greater than the triangular wave, outputs a high level signal, on the other hand, if the output from the D/A converter 73 is less than the triangular wave, outputs a low level signal. Thus PWM is performed. The output from the comparator 75 is inputted as the Laser-ON signal (Laser1-ON) into the laser drive control circuit 112, and it becomes the ON-drive signal to the laser diode LD1. Further, the offset amount of the triangular wave is determined based on the output from the D/A converter 76, and controlled by minimum pulsewidth control data from a CPU 210 (FIG. 10) to be described later. Note that the maximum range of the output from the D/A converter 73 is determined based on an output from a D/A converter 77, and similarly controlled by maximum pulsewidth control data from the CPU 210.

Figure 7:
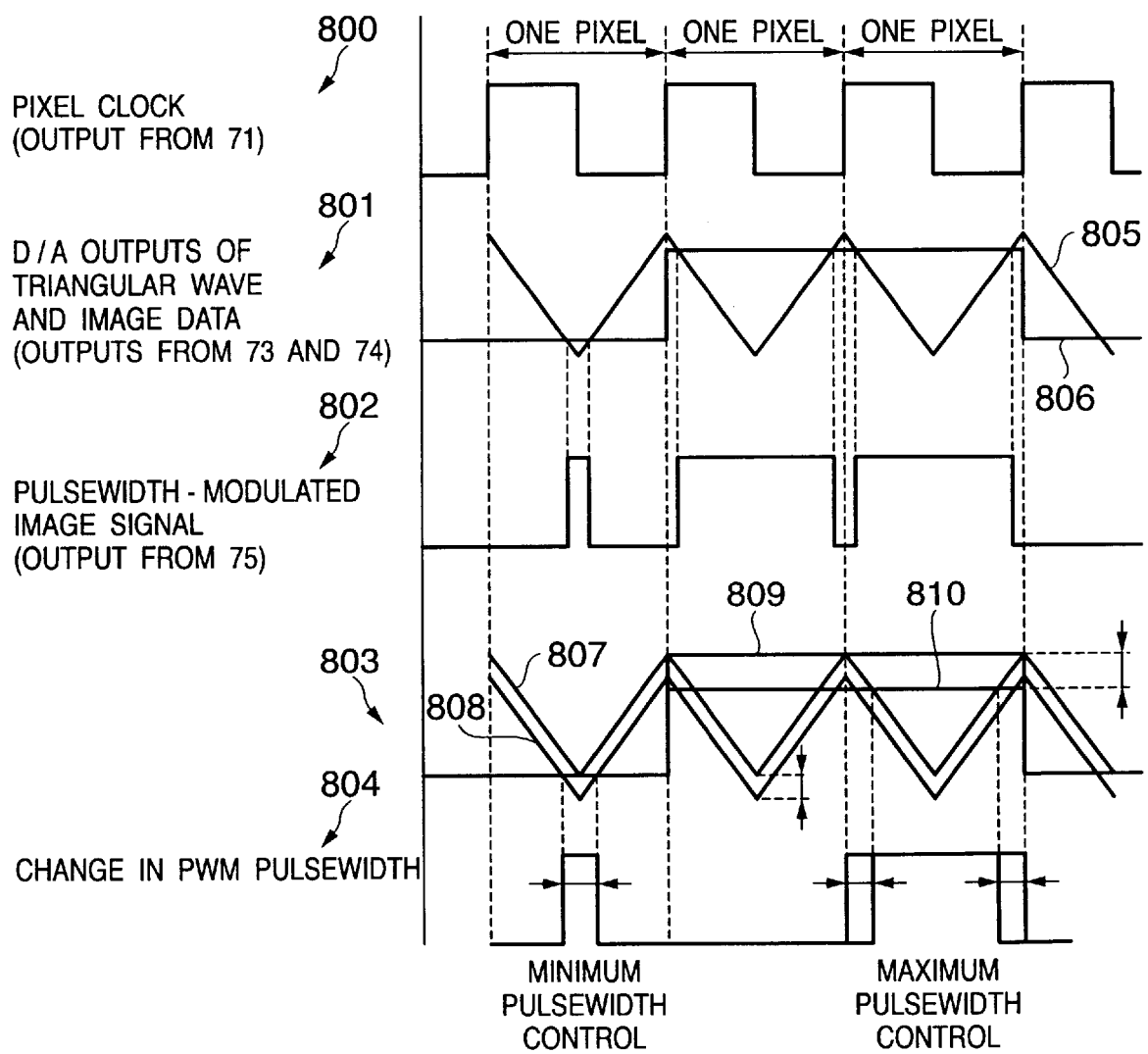
FIG. 7 is a timing chart showing a PWM waveform outputted from the PWM circuit.

FIG. 7 shows the waveforms of respective elements for explaining the PWM in the PWM circuit 113.

In synchronization with a pixel clock 800 (output from the crystal oscillator 71) representing the minimum unit of each pixel, a triangular wave 805 (output from the OP amplifier 74) and image data D/A output 806 (output from the D/A converter 73) are outputted (denoted as 801). Further, as denoted as 802, the comparator 75 compares the triangular wave 805 with the image data D/A output 806, and as a result, a pulsewidth modulated output is obtained. Further, as denoted as 803, the offset amount added to the triangular wave is controlled by the output from the D/A converter 76, thereby the minimum pulsewidth is controlled. Numeral 807 denotes a state where the offset of the triangular wave 805 is increased and the signal level of the triangular wave is increased (the minimum pulsewidth is reduced), and 808, a state where the triangular signal level is reduced (the minimum pulsewidth is increased). Further, numeral 809 denotes a state where the output from the D/A converter 77 is controlled so as to increase the output level of the D/A converter 73 (the maximum pulsewidth is increased), and 810, a state where the output level of the D/A converter 73 is reduced (the maximum pulsewidth is reduced). In this manner, the maximum pulsewidth of the PWM output can be controlled by controlling the output maximum range of the D/A converter 77. Numeral 804 denotes a state where the PWM minimum pulsewidth is changed by controlling the offset amount and a state where the PWM maximum pulsewidth is changed by controlling the maximum output range of the D/A converter 77.

Figure 5B:
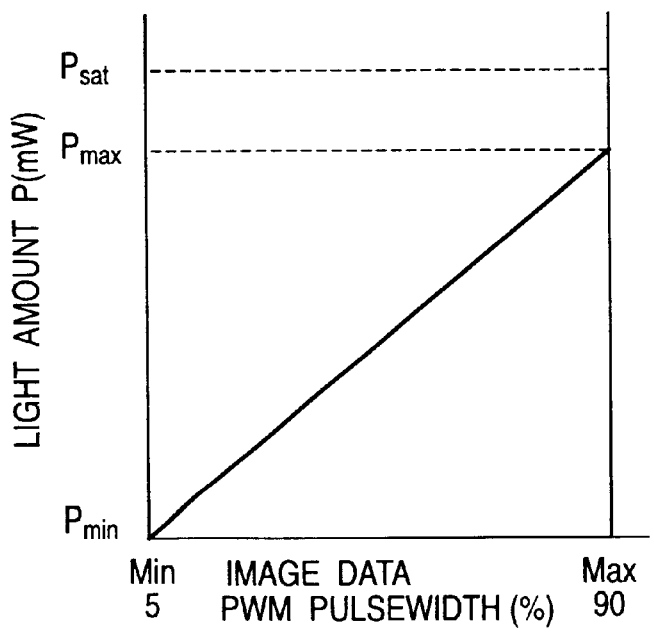

Further, as the control range in the laser characteristic in FIG. 5A, a section E may be set to the minimum pulsewidth by the minimum pulsewidth control, and a section F may be set to the maximum pulsewidth by the maximum pulsewidth control. As the point A is included in the section E and the point B, in the section F, the point A can be set to the image data minimum value point and the point B, to the image data maximum value point by the maximum and minimum pulsewidth controls. In case where these controls are made such that Min=5% and Max=90% hold, as in the characteristic in FIG. 5B, the linear relation can be maintained between the PWM pulsewidth and the amount of laser light emission with respect to all the image data.

Next, the influence due to the input offset voltages from the buffer 10 and the OP amplifer 14 in the laser drive control circuit 112 in FIG. 3 will be examined. Assuming that the input offset voltage from the buffer 10 is Vos1 and the input offset voltage from the OP amplifier 14 is Vos2, the current (Imonitor) flows through the variable resistor (VR1) 8, thereby the voltage outputted as the voltage PDOUT with respect to the voltage (Vmon1) becomes $$PDOUT=(1+R2/R1)\{(Vmon1-Vos1)-Vos2\} \quad (1),$$

which is lower than the ideal value of the voltage PDOUT $$(1+R2/R1)Vmon1 \quad (2)$$

by $$-(1+R2/R1)(Vos1+Vos2) \quad (3).$$

To cancel the offset components, a current corresponding to the amount of reduction may be flowed through a switch (SW5) 23 and the switch (SW1) 6 to the variable resistor (VR1) 8. The current value I to cancel the offset components determined by the expression (3) is $$I=(1+R2/R1)(Vos1+Vos2)/VR1 \quad (4)$$

Figure 8:
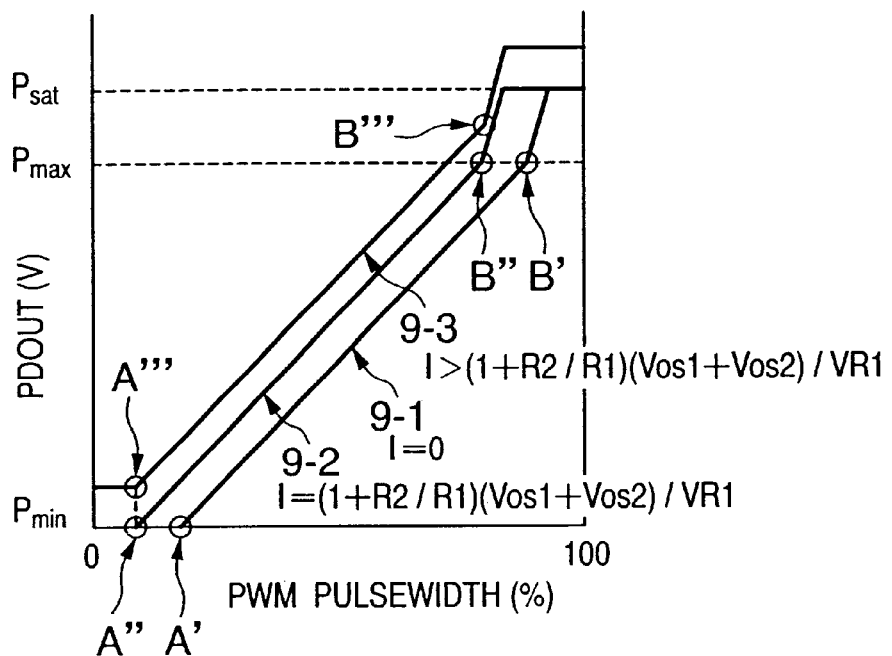
FIG. 8 is a line graph showing the relation between the laser light amount and the output PDOUT with respect to the PWM pulsewidth, for explaining the minimum and maximum pulsewidth control according to the present embodiment.

FIG. 8 shows the characteristic of the voltage PDOUT with respect to the PWM pulsewidth in a case where the current value I is supplied from a constant current source 22.

In FIG. 8, numeral 9-1 denotes a characteristic where the influence of the offset components appears when the current does not flow, and 9-2, a characteristic where the influence of the offset components is cancelled by flowing the current by the current value I in the expression (4).

Figure 9:
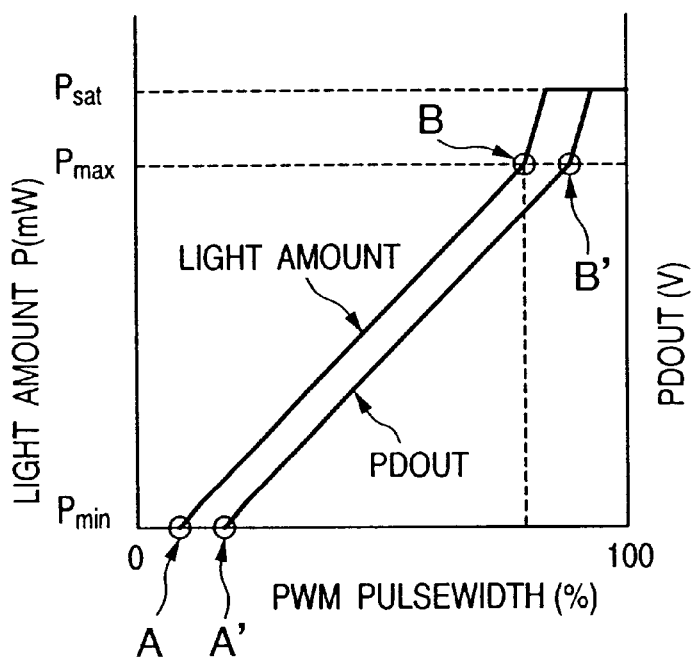
FIG. 9 is a line graph showing the relation between the laser light amount and the output PDOUT with respect to the PWM pulsewidth.

As it can be understood from FIG. 8, a point A' on the characteristic 9-1 representing the rise of the voltage PDOUT for minimum pulsewidth control is shifted to a point A". This corresponds with the PWM pulsewidth on the point A in FIG. 9 showing the characteristic of light amount.

Further, in FIG. 8, a point B' on the characteristic 9-1 for maximum pulsewidth control is shifted to a point B". Also this corresponds with the PWM pulsewidth on the point B in FIG. 9. Note that when an accurate voltage value of the offset component is not known, the current that flows from the constant current source 22 may be a current value equal to or greater than the current value determined by the expression (4).

In FIG. 8, numeral 9-3 denotes a PDOUT characteristic when a current equal to or greater than the current value determined by the expression (4) flows from the constant current source 22. In this characteristic, the point A" becomes a point A'", however, as the point A" on the characteristic 9-2 is merely shifted on the characteristic 9-3, the PWM pulsewidth is not changed. Similarly, the point B" on the characteristic 9-2 becomes a point B'", however, as the PWM pulsewidth is not changed, the maximum and minimum pulsewidths after the control are the same.

Figure 11A:
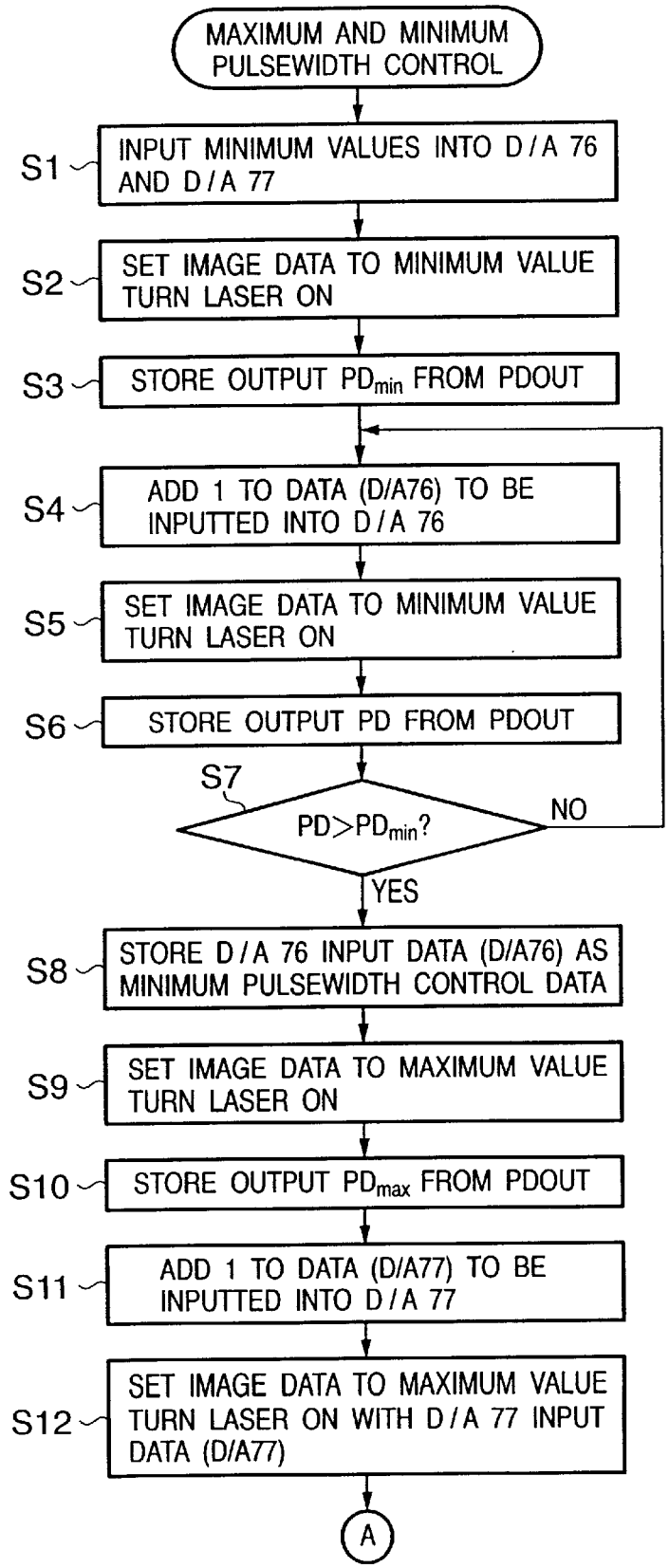
FIGS. 11A and 11B are flowcharts showing processing of minimum and maximum pulsewidth control in the image forming apparatus according to the embodiment.
Figure 11B:
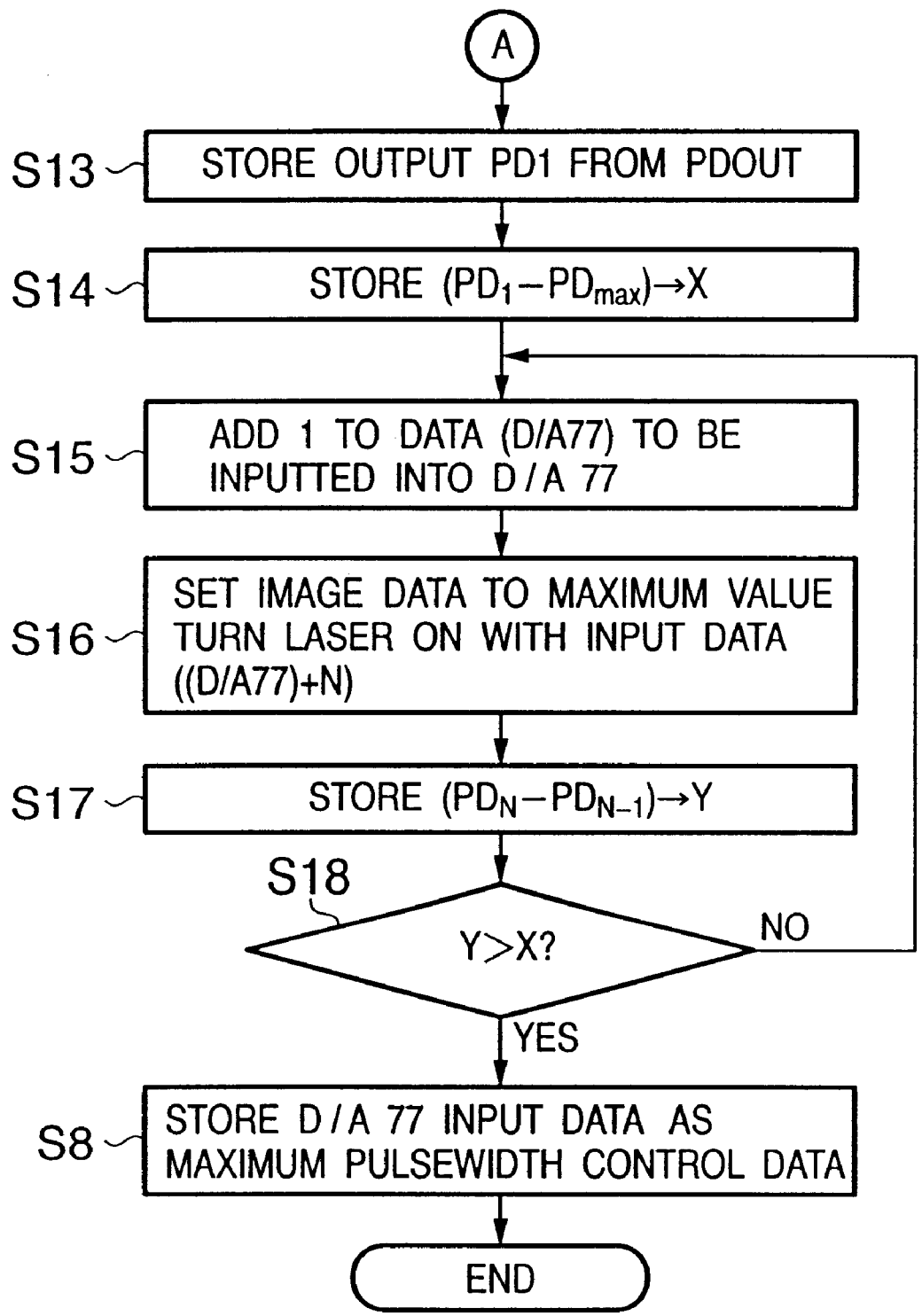

Accordingly, the laser drive control circuit 112 can perform accurate pulsewidth control without influence of offset component from the OP amplifier 14 by controlling the PWM minimum and maximum pulsewidths in accordance with the flowchart shown in FIGS. 11A and 11b while flowing a predetermined current from the constant current source 22 with the switch (SW5) 23 closed.

Figure 10:
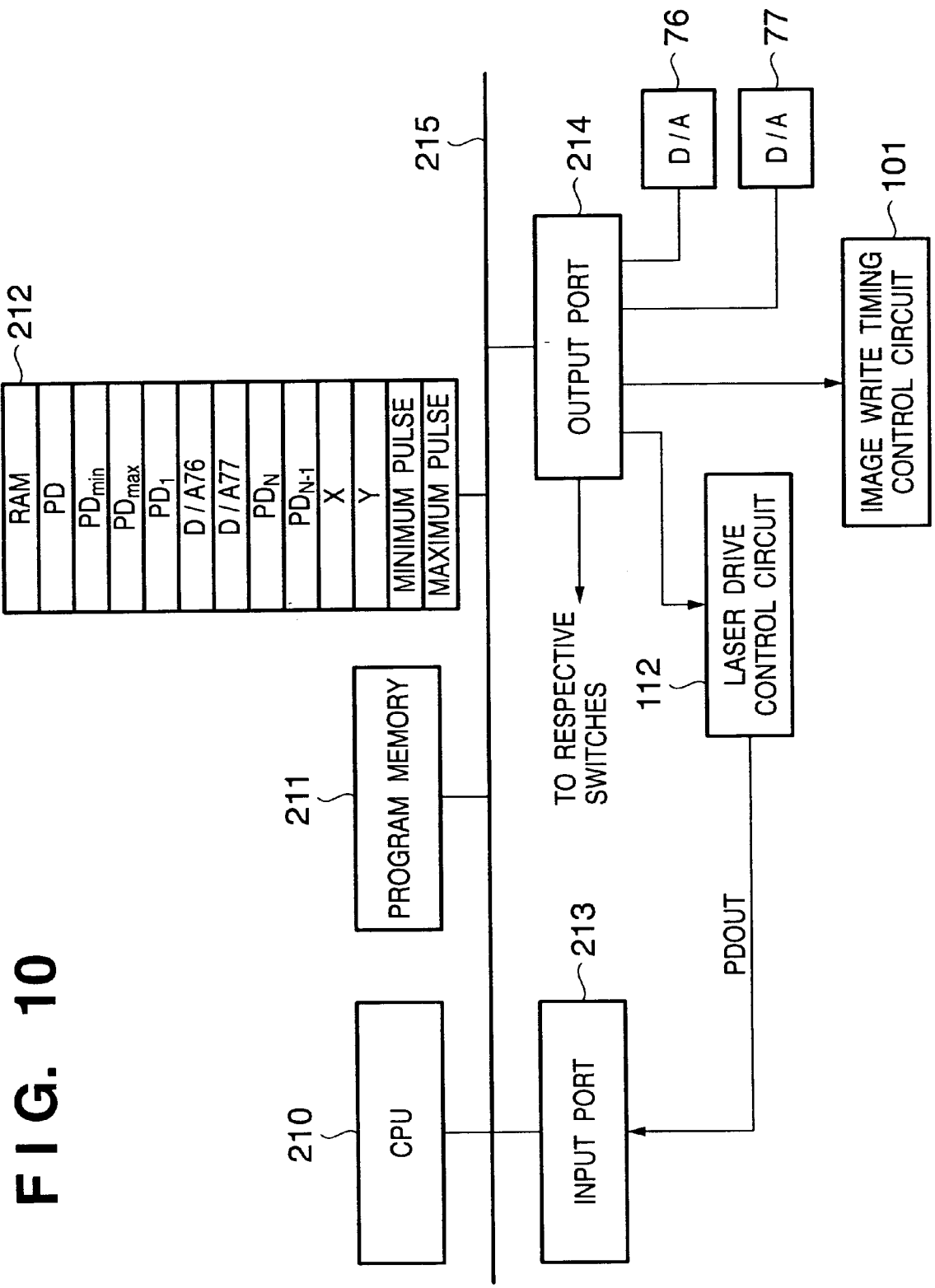
FIG. 10 is a block diagram showing a schematic construction of a controller of the image forming apparatus (laser-beam printer) according to the embodiment.

FIG. 10 is a block diagram showing the construction of a controller of the image forming apparatus according to the present embodiment. The image write timing control circuit 101 and the laser drive control circuit 112 in FIG. 1, a printer engine and the like, are controlled based on control signals and control data from the controller.

In FIG. 10, the CPU 210 controls the overall apparatus. Numeral 211 denotes a program memory in which a control program executed by the CPU 210 and various data are stored; 212, a RAM used as a work area upon execution of control processing by the CPU 210, for temporarily storing various data, and used for storing image data such as print data; 213, an input port used for inputting signals from various sensors, or inputting the voltage PDOUT for obtaining the voltage level by using e.g. an A/D converter; and 214, an output port connected to the above-described D/A converters 76 and 77. The control data is set in the D/A converter via the port 214. Further, the output port 214 is connected to the image write timing control circuit 101 and the laser drive control circuit 112, thereby the laser diode can be driven and the laser drive control circuit 112 can be controlled by the CPU 210.

Note that in the RAM 212, the value of the voltage PDOUT is stored in areas PD, PDN and PDN-1; the minimum and maximum values are stored in areas PDmin and PDmax; the value of the voltage PDOUT, when the image data has a maximum value and "minimum value+1" is inputted into the D/A converter 77 to turn the laser LD on, is stored in an area PD1; data to be outputted to the D/A converters 76 and 77 are stored in areas D/A76 and D/A77; the result of calculation (PD1-PDmax) is stored in an area X; the result of calculation (PDN-PDN-1) is stored in an area Y; and finally-determined minimum pulsewidth control data and maximum pulsewidth control data are stored in areas "minimum pulse" and "maximum pulse". Note that in this figure, only data for one PWM circuit is shown, however, actually, plural data sets corresponding to the number of PWM circuits are stored.

FIGS. 11A and 11B are flowcharts showing PWM minimum and maximum pulsewidth control processing in the image forming apparatus according to the present embodiment. Note that the processing will be described as control for one PWM circuit, but control for other PWM circuits can be made in a similar manner.

First, at step S1, minimum value data are inputted into the D/A converters 76 and 77 of the PWM circuits 113 and 114 via the output port 214 (the minimum value data are stored in the areas D/A76 and D/A77 of the RAM 212). The minimum pulsewidth is set to a minimum value in the minimum pulsewidth control, and by increasing the input data to the D/A converter 76, the minimum pulsewidth is increased. Further, the maximum pulsewidth is set to a minimum value in the maximum pulsewidth control, and by increasing the input data to the D/A converter 77, the maximum pulsewidth is increased. Next, the process proceeds to step S2, at which image data to be outputted to the PWM circuit is set to a minimum value to turn the laser LD on. Next, at step S3, the voltage PDOUT is inputted via the input port 213 at timing of image center, and the value (A/D converted value) is stored in the area $PD_{min}$ of the RAM 212. Next, at step S4, "1" is added to data (value in the area D/A76) to be inputted into the D/A converter 76, and at step S5, the image data is set to a minimum value and the laser LD is turned on. Then at step S6, the value of the voltage PDOUT is inputted at timing of the center, and the value is stored in the area PD of the RAM 212.

The process proceeds to step S7, at which the values in the areas PD and $PD_{min}$ are compared with each other. If the value in the area PD obtained at step S6 is greater, the process proceeds to step S8, at which the data (D/A76) inputted in the D/A converter 76 is stored in the area "minimum pulse" of the RAM 212 as the minimum pulsewidth control data, while if the value in the area PD is less than the value in the area $PD_{min}$, the process returns to step S4.

Next, processing to set the maximum pulsewidth is executed at step S9 and the subsequent steps.

First, at step S9, the image data is set to a maximum value and the laser LD is turned on. Then at step S10, the value of the voltage PDOUT is inputted at timing of image center and stored in the area $PD_{max}$ of the RAM 212. The process proceeds to step S11, at which "1" is added to the data (D/A77) to be inputted into the D/A converter 77 (the value in the D/A77 of the RAM 212 is incremented). At step S12, the image data is set to a maximum value, then the data "(D/A77)+1" is inputted to the D/A converter 77, and the laser LD is turned on. At step S13, the value of the voltage PDOUT is stored in the area $PD_1$ of the RAM 212 at timing of image center. Next, at step S14, $(PD_1-PD_{max})$ is calculated, and the result of calculation is stored in the area X of the RAM 212, and set N to be "2".

Then at step S15, "1" is added to the data (D/A77) to be inputted into the D/A converter 77. At step S16, the image data is set to the maximum value, then the data ((D/A77)+1) where "1" has been added at step S15 is inputted into the D/A converter 77, and the laser LD is turned on. The process proceeds to step S17, at which the value $PD_N$ of the PDOUT is stored into the RAM 212 at timing of image center, then $(PD_N-PD_{N-1})$ ($P_2-P_1$ at an initial time) is calculated, and the result of calculation is stored into the area Y of the RAM 212. Then at step S18, the values in the areas Y and X are compared with each other, and if the data in the area Y is greater than the data in the area X, the process proceeds to step S19, at which the data ((D/A77)+N) inputted into the D/A converter 77 is stored into the area "maximum pulse" of the RAM 212 as the maximum pulsewidth control data, while if the data in the area Y is less than the data in the area X, the process returns to step S15, where N is added "1".

The value of the minimum pulsewidth control data and the value of the maximum pulsewidth control data respectively inputted into the D/A converters 76 and 77 are determined in this manner and stored into the RAM 212.

The present embodiment has been described in case of 2-beam printing system, however, the present invention is not limited to the 2-beam printing system but can be applied to 1-beam system and multi-beam systems other than the 2-beam system.

The present invention can be applied to a system constituted by a plurality of devices (e.g., a host computer, an interface, a reader and a printer) or to an apparatus comprising a single device (e.g., a copy machine or a facsimile apparatus).

Further, the object of the present invention can be also achieved by providing a storage medium (or recording medium) storing software program code for performing the aforesaid processes to a system or an apparatus, reading the program code with a computer (e.g., CPU, MPU) of the system or apparatus from the storage medium, then executing the program. In this case, the program code read from the storage medium realizes the functions according to the embodiment, and the storage medium storing the program code constitutes the invention. Furthermore, besides aforesaid functions according to the above embodiment are realized by executing the program code which is read by a computer, the present invention includes a case where an OS (operating system) or the like working on the computer performs a part or entire processes in accordance with designations of the program code and realizes functions according to the above embodiment.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiment.

As described above, according to the present invention, minimum and maximum pulsewidth control is performed upon pulsewidth modulation of image signal, by flowing a predetermined current from a constant current source to a variable resistor serially connected to a photosensor (PD) which detects laser light and monitoring an output from an OP amplifier which inputs a voltage occurred in the variable resistor and generate a monitor voltage. This enables accurate pulsewidth control without influence of offset component from the OP amplifier.

The present invention is not limited to the above embodiments and various changes and modifications can be made within the spirit and scope of the present invention. Therefore, to appraise the public of the scope of the present invention, the following claims are made.

What is claimed is:

1. An image forming apparatus for forming an image by modulating laser light in accordance with an image signal, comprising:

detection means for detecting laser light emitted from a laser diode and generating a detection current corresponding to the intensity of the laser light;

detection voltage generation means for generating a detection voltage based on the detection current outputted from said detection means; and current supply means for adding a predetermined current to the detection current generated by said detection means and applying the detection current to said detection voltage generation means so as to compensate for the detection voltage generated by the detection voltage generation means.

2. The image forming apparatus according to claim 1, further comprising:

PWM means for generating a modulation signal pulsewidth-modulated based on the image signal; and determination means for determining a minimum pulsewidth and a maximum pulsewidth in the pulsewidth modulation signal outputted from said PWM means, based on the detection voltage generated by said detection voltage generation means.

3. The image forming apparatus according to claim 2, wherein said determination means has drive means for driving the laser diode based on predetermined data, wherein said determination means determines the predetermined data when the detection voltage generated by said detection voltage generation means changes from a minimum value in correspondence with driving by said drive means, as first control data to determine the minimum pulsewidth, and determines the predetermined data when the detection voltage generated by said detection voltage generation means first becomes equal to or greater than a predetermined value in correspondence with the driving by said drive means, as second control data to determine the maximum pulsewidth.

4. The image forming apparatus according to claim 2, wherein said PWM means including:

D/A conversion means for converting a digital image signal into an analog signal;

triangular wave generation means for generating a triangular wave signal in synchronization with a pixel period;

first control means for changing an offset of the analog signal outputted from said D/A conversion means in correspondence with the second control data;

second control means for controlling an offset of the triangular wave signal generated by said triangular wave generation means in correspondence with the first control data; and means for comparing the triangular wave signal with the analog signal and generating a pulsewidth modulation signal of the digital image signal.

5. The image forming apparatus according to claim 1, wherein said detection voltage generation means including:

a resistor that generates a voltage corresponding to the detection current; and amplification means for inputting and amplifying the voltage generated by the resistor, and wherein the predetermined current is a current to compensate for voltage drop due to an offset voltage of said amplification means.

6. A laser drive control method in an image forming apparatus for forming an image by modulating laser light in accordance with an image signal, comprising:

a detection step of detecting laser light emitted from a laser diode and generating a detection current corresponding to the intensity of the laser light;

a detection voltage generation step of generating a detection voltage based on the detection current outputted at said detection step; and a current supply step of adding a predetermined current to the detection current generated at said detection step so as to compensate for the detection voltage generated at said detection voltage generation step.

7. The laser drive control method in an image forming apparatus according to claim 6, wherein the laser diode is driven by a modulation signal pulsewidth-modulated based on the image signal, and wherein said method further comprises a determination step of determining a minimum pulsewidth and a maximum pulsewidth in the pulsewidth modulation based on the detection voltage generated at said detection voltage generation step.

8. The laser drive control method in an image forming apparatus according to claim 7, wherein said determination step has a drive step of driving the laser diode based on predetermined data, and wherein at said determination step, the predetermined data when the detection voltage generated at said detection voltage generation step changes from a minimum value in correspondence with driving by said drive means, is determined as first control data to determine the minimum pulsewidth, and the predetermined data when the detection voltage generated at said detection voltage generation step first becomes equal to or greater than a predetermined value in correspondence with the driving at said drive step, is determined as second control data to determine the maximum pulsewidth.

9. The laser drive control method in an image forming apparatus according to claim 6, wherein said detection voltage generation step has an amplification step of inputting and amplifying a voltage, generated by a resistor in correspondence with the detection current, and wherein the predetermined current is a current to compensate for voltage drop due to an offset voltage at said amplification step.

* * * * *